(No Model.)
S. V. MAIN.
CORN PLANTER.
No. 274,351. Patented Mar. 20, 1883.
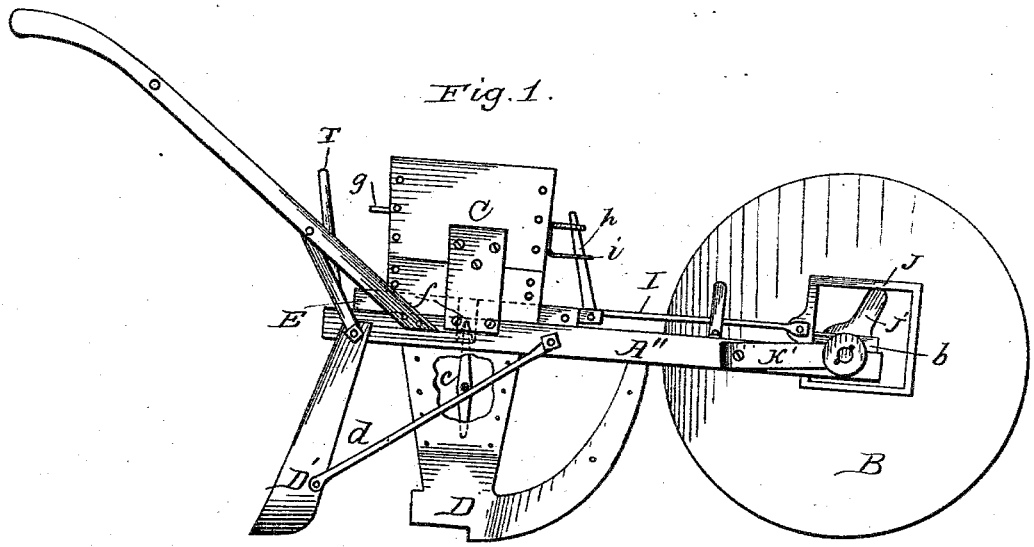
Fig. 1.
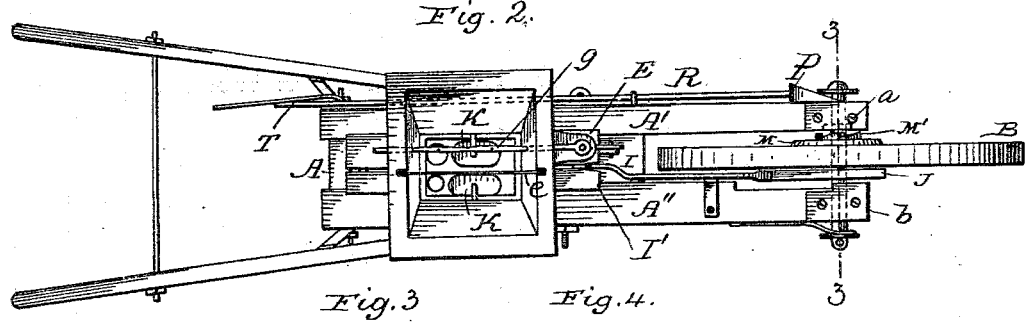
Fig. 2.
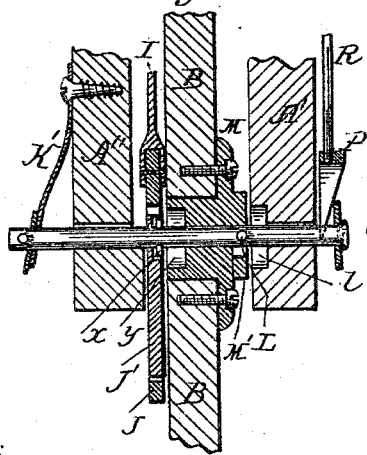
Fig. 3. Fig. 4.
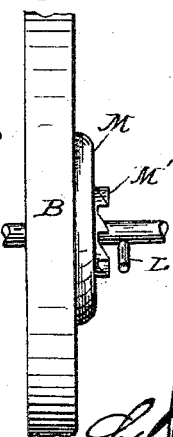
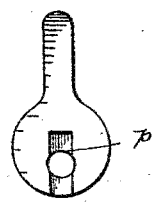
Fig. 5.
Witnesses:
C. M. Johnson
W. F. Crossman
Inventor
Sylvester V. Main
By [signature]
Attys.

UNITED STATES PATENT OFFICE.

SYLVESTER V. MAIN, OF NAPOLEON, INDIANA.

CORN-PLANTER.

SPECIFICATION forming part of Letters Patent No. 274,351, dated March 20, 1883.

Application filed August 2, 1882. (No model.)

*To all whom it may concern:*

Be it known that I, SYLVESTER V. MAIN, a citizen of the United States of America, residing at Napoleon, in the county of Ripley and State of Indiana, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in seed-planters; and it consists more especially in the novel construction and combination of the parts, as will be hereinafter set forth, and pointed out in the claims.

In annexed drawings, Figure 1 represents a side view of my improved corn-planter. Fig. 2 is a top or plan view. Fig. 3 is a sectional view taken through the line $z\ z$ of Fig. 2, and Figs. 4 and 5 are detailed views.

In the several figures identical parts are designated by corresponding letters of reference.

In the accompanying drawings, A represents the frame, which is composed of two longitudinal bars, A' A'', which are connected in front and rear of the seed or fertilizer receptacle or hopper by blocks of a suitable width.

Within the bars A' A'' is located a large transporting or driving wheel, B. The axle of this wheel passes through suitable journals, $a$ and $b$, attached on the upper part of the bars A' A'', near their forward ends.

Upon the rear part of the frame, and above the same, is attached a hopper, C, having a partition, $e$, for the reception of the seed and fertilizer.

Attached to the frame A, under the hopper C, is a suitable shoe or furrow-opener, D, which is hollow at the portion under the hopper. This portion of the shoe acts as a seed and fertilizer guide or spout, while the forward part of the shoe, which spreads at the base, opens the ground for the reception of the seed.

The spout or hollow portion of the shoe D is provided under the seed-box with a suitable rock-shaft, $c$, for the purpose which will be hereinafter set forth.

To the rear part of the frame A is attached suitable coverers, D', which are secured to the frame by rods $d$. The frame A under the hopper is formed with an open space, which is closed by a metallic plate having suitable openings for the passage of the seed to the spout. Above this plate are located reciprocating bars or slides E. Each of these slides is provided with two feed-openings or circular perforations. These slides are connected to each other at their ends by suitable cross-bars, and are held apart by washers, so as to form an open groove, into which the partition $e$ of the hopper passes.

To one or both of the slides E are attached prongs $f$, having $\wedge$-shaped openings, which fit over the upper end of the rock-shaft $c$ and operate the same. This rock-shaft allows the seed to fall in place upon the ground before the next charge is dropped in the spout. This prevents the spout from becoming clogged with the seed or fertilizer.

Handles are attached to the rear of the frame, and project over the frame in the usual manner.

The hopper C is provided near its central portion with agitators $g$, having on their ends eyes, through which pass the upper end of the rock-shaft $h$, which passes loosely through a perforation in the plate $i$, which is attached to the forward part of the hopper. The lower end of this rock-shaft is pivotally attached to the feed-slide E. By means of this lever $h$ the agitators are given a reciprocating motion when the slides are moved.

Above the slides E, and immediately over the opening in the metallic plate, are covers or plates K K, which are attached by suitable means to the sides of the hopper. The seed-dropping attachments, consisting of the agitator, feed-slide, and rock-bar, are all operated through the medium of a connecting-rod, I, which is attached at one end, between the seed-slides, to their connecting cross-bar. This rod I terminates at the other end in a square frame, J, which is located between the driving-wheel B and longitudinal bar A'' of the frame A, which bar is recessed, as shown in Fig. 2. The connecting-rod I is operated by a suitable cam, J', which is attached to the axle of the driving-wheel, as will be hereinafter described. By means of this cam and frame the feed-slides are moved so as to drop seed for two hills at each revolution of the driving-wheel.

Rigidly secured to the driving-wheel B, on the side opposite the cam J', is a circular plate, M, which is provided with a central raised portion, M', having ratchet-teeth. This casting is secured to the central portion of the wheel B. The axle or shaft is provided with a pin, L, which engages with the ratchet M' when the machine is in gear.

The cam J' is provided on the side adjacent to the driving-wheel with a slot, p, which extends on each side of the shaft or axle. This slot is for the reception of the pin x, which is attached to the axle. This pin, when the machine is out of gear, turns freely in the recess y, which is formed in the central portion of the wheel B around the shaft. The shaft is held in gear by a suitable spring, K', one end of which is secured to the bar A'', while the other end is attached to the end of the axle by a washer and pin, as shown in Fig. 3.

To throw the driving-wheel out of gear, when it is desirable to employ the same for transporting the planter, I have provided a bifurcated wedge, P, the fingers of which wedge fit over the axle and under a washer attached to the end of the axle. This wedge is attached to the rod R, which passes through suitable guides to the rear of the frame A, where it is attached to a lever, T. When it is desirable to throw the driving-wheel out of gear the lever T is pressed forward. This action causes the wedge P to enter under the washer, which draws the shaft or axle to one side and out of mesh, the pin L on the axle entering the circumferential recess l in the bar A', and the pin x, which engages with the slot p in the cam J', in the circumferential groove y in the wheel B.

The operation of this implement will be readily understood from the accompanying drawings, and it will be noticed that the movement necessary is imparted to the seed-dropping part by a single rod.

What I claim as new, and desire to secure by Letters Patent, is—

1. In combination with a slide-shaft, the spring K' and rod R, having bifurcated wedge P, for the purpose set forth.

2. A shaft or axle having pins L and x, in combination with the driving-wheel provided with casting M, having ratchet-teeth M', and recess y, slotted cam J', frame J, and rod I, substantially as described, and for the purpose set forth.

In testimony whereof I affix my signature in presence of two witnesses.

SYLVESTER V. MAIN.

Witnesses:
CHAS. B. JOHNSON,
CHARLES F. HAZELRIGG.